(12) United States Patent
Takahashi et al.

(10) Patent No.: US 7,968,200 B2
(45) Date of Patent: Jun. 28, 2011

(54) CERAMIC PRODUCT AND CERAMIC MEMBER BONDING METHOD

(75) Inventors: Yosuke Takahashi, Nagoya (JP); Sumihito Sago, Nagoya (JP); Seiji Yamada, Nagoya (JP); Masayoshi Hirano, Nagoya (JP)

(73) Assignee: Noritake Co., Ltd, Nagoya-shi (JP)

( * ) Notice: Subject to any disclaimer, the term of this patent is extended or adjusted under 35 U.S.C. 154(b) by 0 days.

(21) Appl. No.: 12/392,588

(22) Filed: Feb. 25, 2009

(65) Prior Publication Data

US 2009/0214923 A1    Aug. 27, 2009

(30) Foreign Application Priority Data

Feb. 25, 2008  (JP) ................................. 2008-042443
Feb. 25, 2008  (JP) ................................. 2008-042449

(51) Int. Cl.
  H01M 8/12    (2006.01)
  B01D 39/06   (2006.01)
  C03C 8/24    (2006.01)
  B32B 17/06   (2006.01)
  B32B 37/06   (2006.01)

(52) U.S. Cl. ............ 428/428; 428/426; 55/523; 501/15; 429/479

(58) Field of Classification Search ................ None
See application file for complete search history.

(56) References Cited

U.S. PATENT DOCUMENTS

| | | | |
|---|---|---|---|
| 5,820,654 A * | 10/1998 | Gottzman et al. | |
| 6,248,465 B1 * | 6/2001 | Zhou et al. ............... | 429/33 |
| 6,464,953 B1 * | 10/2002 | Macaudiere et al. | |
| 7,108,938 B2 * | 9/2006 | Ukai et al. .............. | 429/40 |
| 2003/0056692 A1 * | 3/2003 | Hoshikawa et al. ......... | 106/35 |
| 2005/0006249 A1 * | 1/2005 | Suzuki et al. ............. | 205/633 |
| 2005/0255355 A1 * | 11/2005 | Ukai et al. .............. | 429/30 |
| 2005/0277541 A1 * | 12/2005 | Yoshii et al. | |
| 2006/0093884 A1 * | 5/2006 | Seabaugh et al. .......... | 429/33 |
| 2006/0160690 A1 * | 7/2006 | Cortright et al. | |
| 2006/0172875 A1 * | 8/2006 | Cortright et al. .......... | 501/15 |
| 2008/0075984 A1 * | 3/2008 | Badding et al. ........... | 429/12 |
| 2008/0131739 A1 * | 6/2008 | Badding et al. ........... | 429/13 |
| 2008/0305356 A1 * | 12/2008 | Weil et al. .............. | 428/640 |

FOREIGN PATENT DOCUMENTS

| | | |
|---|---|---|
| EP | 0661243 | 7/1995 |
| EP | 1245548 | 10/2002 |
| JP | 05330935 | * 12/1993 |
| JP | 06033182 | 5/1994 |
| JP | 09129251 | 5/1997 |
| JP | 1170314 | 3/1999 |
| JP | 11154525 | 6/1999 |

(Continued)

OTHER PUBLICATIONS

Yin et al. J. Solid State Electrochem (2006) 10, 643-650.*

(Continued)

Primary Examiner — Timothy M Speer
Assistant Examiner — Vera Katz
(74) Attorney, Agent, or Firm — Turocy & Watson, LLP

(57) ABSTRACT

The ceramic product provided by the present invention is provided with at least two ceramic members bonded to each other, and the bond parts between these ceramic members bonded to each other are formed from glass having leucite crystals precipitated within the glass matrix.

4 Claims, 3 Drawing Sheets

FOREIGN PATENT DOCUMENTS

| | | |
|---|---|---|
| JP | 11307118 | 11/1999 |
| JP | 2000251534 | 9/2000 |
| JP | 2000251535 | 9/2000 |
| JP | 2000511507 | 9/2000 |
| JP | 2001093325 | 4/2001 |
| JP | 2001348220 | 12/2001 |
| JP | 2002083517 | 3/2002 |
| JP | 2002292234 | 10/2002 |
| JP | 2002349714 | 12/2002 |
| JP | 2005034275 | 2/2005 |
| JP | 2005187436 | 7/2005 |
| JP | 2006082040 | 3/2006 |
| JP | 2006512275 | 4/2006 |
| JP | 2007051032 | 3/2007 |
| JP | 2007051034 | 3/2007 |
| JP | 2007051035 | 3/2007 |
| JP | 2007117884 | 5/2007 |
| JP | 2007217209 | 8/2007 |
| JP | 2008013425 | 1/2008 |
| WO | 03040058 | 5/2003 |
| WO | 2004031088 | 4/2004 |
| WO | 2004063110 | 7/2004 |
| WO | 2007120545 | 10/2007 |
| WO | 2008070065 | 6/2008 |

OTHER PUBLICATIONS

Cattell et al. Dental Materials 17 (2001), 21-33.*
European Search Report for 09250463.8-2111 Mailed Jul. 22, 2009.
Hoshikawa, et al.; Inversion Temperature and Thermal Expansion of Leucite Formed in the System $SiO_2$-$Al_2O_3$-$K_2O$-$Na_2O$, Science and Industry (1986) vol. 60(9), pp. 351-355.
European Office Action dated Jul. 5, 2010 corresponding to U.S. Appl. No. 12/392,588, filed Feb. 25, 2009.
Extended European Search Report for 10157467.1 mailed on Jul. 6, 2010.

* cited by examiner

CERAMIC PRODUCT AND CERAMIC MEMBER BONDING METHOD

BACKGROUND OF THE INVENTION

1. Field of the Invention

The present invention relates to a ceramic product provided with multiple ceramic members. In particular, the present invention relates to a ceramic product provided with at least two ceramic members bonded to one another (examples include oxygen separation membrane elements and solid oxide fuel cells (SOFC)). The present invention also relates to a method for bonding together two ceramic members, and to a bond material for use in this method. In particular, the present invention relates to a method (seal method) and material (seal material) for bonding the solid electrolyte and separator making up an SOFC. The present invention also relates to a seal part (bond part) for maintaining the airtightness of the bond part of an oxygen separation membrane element provided with an oxygen separation membrane made of a perovskite oxide ceramic which is an oxygen ion conductor, as well as a bonding method (seal method) and bond material (seal material) for forming this seal part.

Priority for this application is claimed based on Japan Patent Application No. 2008-042443, submitted on Feb. 25, 2008, and Japan Patent Application No. 2008-042449, submitted on Feb. 25, 2008, and the entire content of these basic applications is incorporated by reference in these specifications.

2. Description of the Related Art

Ceramic products composed of multiple ceramic members bonded together are used in various industrial fields.

One example of such a ceramic product is an oxygen separation membrane element provided with a porous substrate supporting an oxygen separation membrane consisting of an oxide ceramic with a perovskite structure which is an oxygen ion conductor. A simple explanation of an oxygen separation membrane element is provided below.

Oxide ceramics with so-called perovskite structures and oxide ceramics with pyrochlore structures are known as oxygen ion conductors with oxygen ion (typically $O^{2-}$; also called oxide ion) conductivity. In particular, dense ceramic materials consisting of perovskite oxide, a mixed oxygen ion-electron conductor (hereunder called a "mixed conductor") that has electron conduction properties in addition to being an oxygen ion conductor, and typically ceramic materials formed as membranes, are capable of transmitting oxygen ions continuously from one side of the membrane to the other without the use of an external electrode or external circuit to short-circuit between the two sides. Consequently, they can be used favorably as oxygen separation materials for selectively transmitting to one side of a membrane oxygen from an oxygen-containing gas (such as air) supplied to the other side, particularly at high operating temperatures of 800 to 1000° C.

For example, an oxygen separation material (oxygen separation membrane element) provided with an oxygen separation membrane composed of a perovskite oxide or other mixed conductor on a porous substrate can be used favorably as an effective oxygen purification means in place of low-temperature separation or PSA (Pressure Swing Adsorption).

Alternatively, an oxygen separation membrane element of this type can also be used favorably in the field of fuel cells, or in GTL (Gas to Liquid) technology in which a synthetic liquid fuel (methanol or the like) is produced by using oxygen ions supplied from one side of the membrane to the other to oxidize a hydrocarbon (methane gas or the like) supplied to the other side.

As examples of such prior art, Japanese Patent Application Laid-open No. 2000-251534, Japanese Patent Application Laid-open No. 2000-251535, Japanese Patent Publication No. 2000-511507 and Japanese Patent Application Laid-open No. 2001-93325 describe various perovskite oxides that are mixed conductors. International Publication No. WO 2003/040058 pamphlet, Japanese Patent Application Laid-open No. 2006-82040, Japanese Patent Application Laid-open No. 2007-51032, Japanese Patent Application Laid-open No. 2007-51034 and Japanese Patent Application Laid-open No. 2007-51035 disclose good examples of oxygen separation materials (membrane elements) provided with oxygen separation membranes composed of perovskite oxides. Japanese Patent Application Laid-open No. H11-70314 and Japanese Patent Application Laid-open No. 2002-292234 describe cylindrical oxygen separation materials (elements) and devices (modules) provided with these oxygen separation materials.

When oxygen separation devices (modules) are constructed using such cylindrical or otherwise-shaped oxygen separation materials (membrane elements) as basic constituents, because various members are bonded together, the oxygen separation material is constructed with a seal part (bond part) for maintaining airtightness.

In the past, in the case of oxygen separation units (modules) which are used at high operating temperatures of 800 to 1000° C., glass materials and metal materials have been studied as seal materials for the seal part (bond part) in order to ensure the seal properties (airtightness) of the seal part. For example, Japanese Patent Application Laid-open No. 2002-83517 and Japanese Patent Application Laid-open No. 2002-349714 describe examples of conventional seal materials.

Other examples of ceramic products composed of multiple ceramic members bonded together include solid oxide fuel cells (SOFCs), which consist of a fuel electrode, an air electrode, a zirconia solid electrolyte and a separator bonded to this solid electrolyte.

Solid oxide fuel cells (SOFCs), which are also called solid electrolyte fuel cells, have been extensively developed for electrical power generation because they have greater generating efficiency than various other types of fuel cells, are environmentally friendly, and are applicable to various types of fuels.

The basic structure of an SOFC (that is, a single cell) consists of an air electrode (cathode) with a porous structure formed on one side of a dense solid electrode (such as a dense membrane layer) consisting of an oxide ion conductor, and a fuel electrode (anode) with a porous structure formed on the other side of the electrode. Fuel gas (typically hydrogen) is supplied to the surface of the solid electrolyte on the side with the fuel electrode and a gas containing oxygen (typically air) is supplied to the surface of the solid electrolyte on the side with the air electrode.

Since a single SOFC cell can only generate a limited amount of power, normally a stack of many such single-celled structures is used in order to obtain the desired electricity. In the case of stacked SOFCs, separators (also called interconnectors) are used to separate the cells. The separators then needed to be bonded (sealed) to the facing solid electrolyte surfaces so as to maintain a high degree of airtightness between the two.

Solid electrolytes consisting of zirconia materials (typically yttria-stabilized zirconia or YSZ) are widely used as solid electrolytes for SOFCs because of their chemical stability and mechanical strength. Cermets of Nio and zirconia for example are widely used for the fuel electrode, while $LaCoO_3$, $LaMnO_3$ and other oxides with perovskite structures are often used for the air electrode.

Because SOFCs normally have the temperature characteristic of operating well at high temperatures of about 800 to 1200° C., the material forming the separator is chosen so as to have high chemical durability and electrical conductivity in oxidizing and reducing atmospheres at high temperatures, and to have a similar thermal expansion rate as the electrolyte material. Examples of good separator-forming materials include lanthanum-chromite oxides (such as $LaCrO_3$ and $La_{0.8}Ca_{0.2}CrO_3$) and the like.

In the past bond materials of various kinds have been proposed for bonding (sealing) solid electrolytes and separators made of such materials. For example, Japanese Patent Application Laid-open No. H5-330935 describes a bond agent consisting of a mixture of stabilized zirconia and glass. Japanese Patent Application Laid-open No. H9-129251 describes a bond material consisting of a mixture of the solid electrolyte material and the separator material. Japanese Patent Application Laid-open No. H11-154525 describes a sealing liquid consisting mainly of an ultrafine particle oxide with a melting point greater than the operating temperature of a solid electrolyte fuel cell. Japanese Patent Application Laid-open No. H11-307118 is another example of prior art relating to bonding of solid electrolytes.

SUMMARY OF THE INVENTION

When manufacturing ceramic elements having multiple ceramic members such as the oxygen separation membrane elements and SOFCs described above, it is vital that a highly strong and airtight bond be formed between two connected ceramic members. However, conventional bonding methods (and the bond materials used in these bonding methods) have not been adequate to these demands.

In the case of the aforementioned oxygen separation membrane elements for example, the conventional bond materials (seal materials) describes in the patent documents listed above are materials that may become molten at the aforementioned high temperatures (for example, Japanese Patent Application Laid-open No. 2002-349714), and can melt and flow away from the specified bonding site when used at this temperature range (800 to 1000° C. for example). It has therefore been necessary to take measures (such as adding a barrier structure surrounding the melted seal material, or a structure that applies weight in order to prevent outflow of the seal material). Other problems are that when the seal is in a molten state it may not provide sufficient adhesive strength, or may be difficult to use in a pressurized atmosphere.

In contrast to perovskite oxides, which are relatively liable to thermal expansion (with a thermal expansion coefficient of 10 to $15 \times 10^{-6} K^{-1}$ for example), conventional glass materials are resistant to thermal expansion (for example, common borosilicate glass has a thermal expansion coefficient of 1 to $5 \times 10^{-6} K^{-1}$), and when used as bond materials (seal materials), the bond material may crack due to the difference in thermal expansion during low-temperature solidification. Moreover, when an oxygen separation material obtained using a conventional bond material (seal material) with a large difference in thermal expansion is used repeatedly at such a high temperature range, the seal properties of the bond part (seal part) may gradually decline in the course of heating before use and cooling after use, so there is room for improvements in durability.

With respect to the aforementioned SOFCs, moreover, conventional bonding methods (bond materials) such as those described in the patent documents mentioned above are also unsatisfactory from the standpoint of providing both strength and airtightness at a high level.

It is therefore an object of the present invention to provide a ceramic member bonding method capable of achieving greater airtightness (seal function) and mechanical strength than conventional bonding methods (bond materials), as well as a bond material for use in this method.

Another more specific object is to provide a method of bonding (sealing) the solid electrode and separator of an SOFC. It is also another object to provide a bond material (seal material) for use in such a bonding (sealing) method. Another object is to provide an SOFC wherein the solid electrolyte and separator are bonded (sealed) by such a bonding method (bond material).

Another more specific object is to provide a bond material (seal material) making up the seal part (bond) part) of an oxygen separation membrane element provided with an oxygen separation membrane consisting of the aforementioned perovskite oxide, which is a bond material (seal material) capable of providing adequate seal properties without flowing out at the high temperature range used. Another object is to provide a sealing method (or in other words a bonding method) for forming the seal part (bond part) of an oxygen separation membrane element with this bond material, along with an oxygen separation membrane element wherein the seal part (bond part) is formed with such a seal material.

A ceramic product provided by the present invention is a ceramic product with a plurality of ceramic members, wherein at least two ceramic members are bonded to one another, and a bond part between these two bonded ceramic members is formed from a glass (bond material) having leucite crystals precipitated within the glass matrix.

One preferred embodiment of the ceramic product disclosed here is an oxygen separation membrane element provided with a porous substrate supporting an oxygen separation membrane consisting of an oxide ceramic with a perovskite structure which is an oxygen ion conductor. In the oxygen separation membrane element disclosed here, at least one ceramic connecting member is bonded on the oxygen separation membrane. Moreover, a seal part for blocking gas flow (that is, for maintaining airtightness) at the bond part is formed on the bond part between the oxygen separation membrane and the connecting member by means of a glass (bond material) having leucite crystals precipitated within the glass matrix.

In an oxygen separation membrane element of this configuration, the bond part between the oxygen separation membrane and the ceramic connecting member bonded to the oxygen separation membrane is sealed with a glass having leucite ($KAlSi_2O_6$) crystals precipitated within the glass matrix (hereunder called "leucite-containing glass"). Because it contains leucite crystals (for example, fine leucite crystals precipitated in a dispersed state in the glass matrix), this leucite-containing glass is not only mechanically stronger, but also has a higher thermal expansion rate (that is, a higher thermal expansion coefficient), which can approach the thermal expansion rate (thermal expansion coefficient) of the oxide ceramics with a perovskite structure making up the oxygen separation membrane. Moreover, glass with precipitated leucite crystals resists flowing at a temperature range of 800° C. or more, such as 800 to 900° C. or preferably 800 to 1000° C. Thus, there is no danger of glass outflow from the bonding site during use.

Thus, with an oxygen separation element of the configuration disclosed here gas leakage from the bond part (seal part) between the oxygen separation membrane and connecting member can be prevented even with repeated use at a high temperature range such as typically a range of 800 to 1000° C. (or in other words, with repeated heating from room temperature and cooling after use), and a high level of airtightness can be maintained long-term. Consequently, an oxygen separation membrane element with excellent heat resistance and durability is provided by the present invention.

In a preferred embodiment of the oxygen separation membrane element disclosed here, the oxygen separation membrane and connecting member are each composed of an oxide ceramic having a perovskite structure of a composition represented by the general formula $Ln_{1-x}Ae_xMO_3$ (wherein Ln is at least one selected from the lanthanoids, Ae is at least one selected from the group consisting of Sr, Ca and Ba, M is at least one selected from the group consisting of Mg, Mn, Ga, Ti, Co, Ni, Al, Fe, Cu, In, Sn, Zr, V, Cr, Zn, Ge, Sc and Y, and $0 \leq x \leq 1$). It is especially desirable that thermal expansion coefficient of the glass making up the seal part be 10 to $14 \times 10^{-6} K^{-1}$ (typically, the average value between room temperature (25° C.) and 450° C.).

In an oxygen separation membrane element of this configuration, the thermal expansion coefficients of the oxygen separation membrane and connecting member to be bonded are particularly similar to the thermal expansion coefficient of the seal part at the binding site between the two. Thus, an oxygen separation membrane element of this configuration is suited to repeated use at high temperatures, and provides high durability capable of maintaining airtightness long-term.

Another preferred embodiment of the ceramic product disclosed here is a solid oxide fuel cell (SOFC) provided with a fuel electrode (anode), an air electrode (cathode), a zirconia solid electrolyte and a separator bonded to this solid electrolyte. The term "fuel cell" (specifically SOFC) encompasses both single cells and so-called stacks of cells (aggregations of single cells). The term "separator" encompasses members called interconnectors or interconnects.

In the SOFC disclosed here, the separator is formed from a lanthanum-chromite oxide wherein an alkali earth metal may or may not be substituted for part of the lanthanum or chromium. The bond part between the solid electrolyte and the separator is formed from a glass (bond material) having leucite crystals precipitated within the glass matrix.

In a fuel cell of this configuration, the bond part between the YSZ or other zirconia solid electrolyte and the lanthanum-chromite oxide separator is formed from a crystalline-amorphous composite material having leucite ($KAlSi_2O_6$) crystals precipitated within the glass matrix (hereunder called "leucite-containing glass"). Because it contains leucite crystals (for example, fine leucite crystals precipitated in a dispersed state in the glass matrix), this leucite-containing glass resists flowing at a temperature range of 800° C. or more, such as 800 to 1000° C. Consequently, there is no danger of glass outflow from the bonding site at the high temperature range of 800° C. or more (for example, 800 to 1000° C.) which is the preferred operating temperature range for SOFCs, and the mechanical strength of the bond can therefore be increased.

Preferably the bond part is formed from leucite-containing glass having $SiO_2$, $Al_2O_3$, $Na_2O$ and $K_2O$ as essential constituents and preferably containing at least one of MgO, CaO and $B_2O_3$ as an additional constituent. More preferably, it is effectively composed of the following oxide components in the following mass ratios as oxides:

| | |
|---|---|
| $SiO_2$ | 60 to 75 mass % |
| $Al_2O_3$ | 10 to 20 mass % |
| $Na_2O$ | 3 to 10 mass % |
| $K_2O$ | 5 to 15 mass % |
| MgO | 0 to 3 mass % |
| CaO | 0 to 3 mass % |
| $B_2O_3$ | 0 to 3 (preferably 0.1 to 3) mass %. |

The thermal expansion rate (thermal expansion coefficient) of a bond part of this composition can be made to approach that of the solid electrolyte and separator to be bonded. As a result, a fuel cell of the configuration described here gas leakage from the bond part (seal part) between the solid electrolyte and separator can be prevented even with repeated use at a high temperature range such as typically a range of 800 to 1000° C. (or in other words, with repeated heating from room temperature and cooling after use), and a high level of airtightness can be maintained long-term. Consequently, a fuel cell (SOFC) with excellent heat resistance and durability is provided by the present invention.

A ceramic member bonding method is provided as another aspect of the present invention. That is, the bonding method provided by the present invention is a method of bonding two ceramic members that connect to one another, wherein a bond material consisting of a glass with leucite crystals precipitated within the glass matrix is applied to the part to be bonded on at least one of the two ceramic members, and the applied bond material is baked at a temperature range at which there is no outflow of bond material from the applied area.

One preferred embodiment of the ceramic member bonding method disclosed here is a method of bonding (sealing) an oxygen separation membrane element provided with an oxygen separation membrane composed of an oxide ceramic with a perovskite structure that is an oxygen ion conductor.

This method encompasses preparing the oxygen separation membrane element and the ceramic connecting member to be connected to the oxygen separation membrane, applying to the connected parts of the ceramic connecting member and oxygen separation membrane a bond material (glass seal material) consisting of a glass consisting effectively of the following components in the following mass ratios of oxides:

| | |
|---|---|
| $SiO_2$ | 40 to 75 mass % |
| $Al_2O_3$ | 5 to 20 mass % |
| $Na_2O$ | 5 to 20 mass % |
| $K_2O$ | 5 to 20 mass % |
| MgO | 0 to 3 mass % |
| CaO | 0 to 3 mass % |
| SrO | 0 to 3 mass % | and having leucite crystals precipitated in the glass matrix, and baking the bond material (glass seal material) thus applied at a temperature range at which there is no outflow of the bond material (glass seal material) from the area to which it was applied (for example, at least 800° C. but less than 1200° C. or typically at least 900° C. but less than 1200° C. or preferably 1000° C. or more, such as 1000 to 1100° C.) to thereby form a seal part consisting of the bond material (glass seal material) that blocks gas flow at the connected parts of the ceramic connecting member and oxygen separation membrane.

Typically, the bond material (glass seal material) is prepared before use as a paste (glass paste for seal formation)

containing the aforementioned glass components as principal components. The term paste here also includes inks and slurries.

In a bonding method (sealing method) of this configuration, a bond material of the aforementioned composition is applied (typically by applying a bond material prepared as a paste) to the connected parts (that is, the specified bonding site) of the oxygen separation membrane and ceramic connecting member, and baked at the temperature range specified above (that is, at a temperature range at which the bond material can be baked without melting completely). In this way, a seal part is formed on the connected parts consisting of leucite crystals precipitated in a glass matrix (for example, a seal part consisting of leucite-containing glass having fine leucite crystals precipitated in a dispersed state in the glass matrix).

Thus, with a bonding method (sealing method) of this configuration it is possible to form a seal part with improved mechanical strength and a high thermal expansion coefficient. That is, it is possible to achieve a thermal expansion rate (thermal expansion coefficient) close to that of the oxide ceramic with a perovskite structure making up the oxygen separation membrane. Moreover, there is no danger that the seal part thus formed of leucite-containing glass will flow at temperatures at or below the aforementioned baking temperature (for example, at a temperature range of 800 to 900° C. or preferably 800 to 1000° C.).

Consequently, with a bonding method (sealing method) of this configuration it is possible to provide an oxygen separation membrane element with excellent durability and heat resistance sufficient to ensure a high level of airtightness long-term without gas leakage from the bonded part (that is, the seal part of the present invention) between the oxygen separation membrane and connecting member even after repeated use within a temperature range of typically 800 to 1000° C. (or in other words after repeated heating from room temperature and cooling after use). Moreover, because the two members are bonded without completely melting the bond material (glass seal material), it is possible to form a seal part even at bonding sites where seals would be difficult to form with conventional molten seal materials, or sites to which weight cannot be applied.

In a still more preferred embodiment of the oxygen separation membrane element bonding method (sealing method) disclosed here, the oxygen separation membrane and connecting member are each composed of an oxide ceramic having a perovskite structure with a composition represented by the general formula $Ln_{1-x}Ae_xMO_3$ (wherein Ln is at least one selected from the lanthanoids, Ae is at least one selected from the group consisting of Sr, Ca and Ba, M is at least one selected from the group consisting of Mg, Mn, Ga, Ti, Co, Ni, Al, Fe, Cu, In, Sn, Zr, V, Cr, Zn, Ge, Sc and Y, and $0 \leq x \leq 1$). The bond material (glass seal material) is then prepared so that the thermal expansion coefficient of the glass making up the seal part is 10 to $14 \times 10^{-6} K^{-1}$ (typically, the average value between room temperature (25° C.) and 450° C.).

By thus selecting the members (compositions) to be bonded and using a bond material (glass seal material) prepared with such a thermal expansion coefficient, it is possible to provide an oxygen separation membrane element provided with an oxygen separation membrane with a perovskite structure having excellent durability and One preferred embodiment of the ceramic member bonding method disclosed here is a method of bonding the solid electrolyte and separator of a solid oxide fuel cell. In this method, a zirconia solid electrolyte is prepared as the solid electrolyte, and a separator formed from lanthanum-chromite oxide in which an alkali earth metal may or may not be substituted for part of the lanthanum or chromium is prepared as the separator. The method also encompasses applying any of the bond materials disclosed here to the connection site between the solid electrolyte and separator thus prepared, and baking the bond material thus applied at a temperature range at which there is no outflow of bond material from the application site to thereby form a bond made of the bond material that blocks gas flow at the connection site between the solid electrolyte and the separator.

With a method of this configuration it is possible to provide an SOFC with the effects mentioned above. Consequently, another aspect of the present invention provides an SOFC manufacturing method whereby a zirconia solid electrolyte and a lanthanum-chromite oxide separator of the configuration described above are bonded by the aforementioned bonding method using any of the bond materials disclosed here.

One bond material that can be used by preference is a bond material is a glass bond material composed effectively of the following components in the following mass ratios as oxides, and having leucite crystals precipitated within the glass matrix:

| | |
|---|---|
| $SiO_2$ | 60 to 75 mass % |
| $Al_2O_3$ | 10 to 20 mass % |
| $Na_2O$ | 3 to 10 mass % |
| $K_2O$ | 5 to 15 mass % |
| MgO | 0 to 3 mass % |
| CaO | 0 to 3 mass % |
| $B_2O_3$ | 0 to 3 mass %. |

It is particularly desirable to use a bond material prepared with a thermal expansion coefficient of 9 to $10 \times 10^{-6} K^{-1}$.

Also, the baling temperature (maximum baking temperature) is preferably set within the range of 1400 to 1600° C.

Another aspect of the present invention provides a bond material for bonding together various kinds of ceramic members. A bond material provided by the present invention is a bond material for bonding two connected ceramic members, comprising a glass powder having leucite crystals precipitated within the glass matrix, a solvent for dispersing the glass powder, and at least one organic compound that functions as a binder.

One preferred embodiment of the bond material disclosed here is a bond material composed effectively of the following components in the following mass ratios as oxides:

| | |
|---|---|
| $SiO_2$ | 40 to 75 mass % |
| $Al_2O_3$ | 5 to 20 mass % |
| $Na_2O$ | 5 to 20 mass % |
| $K_2O$ | 5 to 20 mass % |
| MgO | 0 to 3 mass % |
| CaO | 0 to 3 mass % |
| SrO | 0 to 3 mass %, | which is used to seal an oxygen separation membrane element provided with a porous substrate supporting an oxygen separation membrane consisting of an oxide ceramic with a perovskite structure which is an oxygen ion conductor.

By using a bond material (that is, a glass seal material) of this configuration, it is possible to provide an oxygen separation membrane element having a seal part (bond part) with excellent durability and heat resistance as described above.

Preferably, this is provided as of a glass seal material in the form of a paste (including inks and slurries, same below)

containing the aforementioned glass components as principal components, or in other words as a glass paste material for seal formation.

In an especially preferred embodiment of a bond material used for sealing an oxygen separation membrane element, the bond material (that is, the glass formed by the bond material) is prepared in advance so as to have a thermal expansion coefficient of 10 to $14 \times 10^{-6} K^{-1}$ (typically, the average value between room temperature (25° C.) and 450° C.). This thermal expansion efficient is close to the thermal expansion coefficient of an oxide ceramic with a perovskite structure. In this way, it is possible to provide an oxygen separation membrane element provided with an oxygen separation membrane with a perovskite structure, in which the bond part (seal part) is especially heat resistant and durable.

Another preferred embodiment of the bond material disclosed here is a bond material for use in bonding the separator and solid electrolyte of a solid oxide fuel cell, wherein the glass is formed from a leucite-containing glass having $SiO_2$, $Al_2O_3$, $Na_2O$ and $K_2O$ as essential consistuents, and preferably containing at least one of MgO, CaO and $B_2O_3$ as additional constituents.

Most preferably, this glass is effectively composed of the following oxide components in the following mass ratios as oxides:

| | |
|---|---|
| $SiO_2$ | 60 to 75 mass % |
| $Al_2O_3$ | 10 to 20 mass % |
| $Na_2O$ | 3 to 10 mass % |
| $K_2O$ | 5 to 15 mass % |
| MgO | 0 to 3 mass % |
| CaO | 0 to 3 mass % |
| $B_2O_3$ | 0 to 3 (preferably 0.1 to 3) mass %, | and has leucite crystals precipitated within the glass matrix.

Using a bond material of this configuration, it is possible to provide an SOFC with excellent mechanical strength and heat resistance as described above.

Preferably, this is provided as a bond material (seal material) in paste form (here and below, includes both ink and slurry forms) having the aforementioned leucite-containing glass as a principal component.

In a particularly preferred embodiment of a bond material to be used for bonding a solid electrolyte and separator, the thermal expansion coefficient of the bond material (that is, the glass formed by the bond material) is adjusted to 9 to $10 \times 10^{-6} K^{-1}$ (typically, the average value between room temperature (25° C.) and 450° C.). This thermal expansion coefficient is close to the thermal expansion coefficients of a YSZ or other zirconia solid electrolyte and separator made of lanthanum-chromite oxide. In this way, it is possible to provide an SOFC with especially good heat resistance and durability of the bond (seal).

DESCRIPTION OF THE PREFERRED EMBODIMENTS

Figure 1:
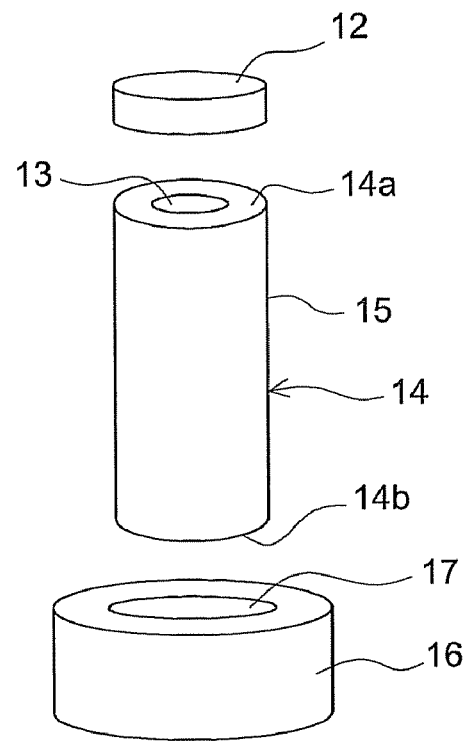
FIG. 1 is an exploded perspective view showing the constituent members of an oxygen separation membrane element of one example.

Preferred embodiments of the present invention are explained below. Matters other than those items (such as the method of preparing the leucite-containing glass making up the bond material) specifically mentioned in these specifications that are necessary for implementing the present invention (raw powder mixing methods and ceramic molding methods, methods of constructing single cells and stacks of fuel cells, etc.) can be understood as design matters for a person skilled in the art based on prior art in the technical field. The present invention can be implemented based on the content disclosed in these specifications and on technical common knowledge in the field.

The ceramic product provided by the present invention is a ceramic product provided with multiple ceramic members of which at least two are bonded to each other, wherein the bond part between the two ceramic members bonded to each other is formed of glass having leucite crystals precipitated within the glass matrix, and ceramic products of various shapes, functions and uses are included within the scope of the present invention as long as they are ceramic products of this configuration.

The bond material provided by the present invention is a bond material (or seal material depending on the object) for use in constructing a ceramic product such as the aforementioned, comprising a glass powder with leucite crystals precipitated within the glass matrix as well as a solvent for dispersing the glass powder, and preferably the bond material disclosed here comprises 1 or 2 or more organic compounds that function as binders. The composition, thermal expansion coefficient and the like of the glass itself making up the bond material can be varied as necessary according to the function and shape of the ceramic product to be constructed using the bond material.

An oxygen separation membrane element, the ceramic members making up this element and the bond material (seal material) for bonding these ceramic members to each other are explained below as one preferred example of the ceramic product provided by the present invention.

In these specifications, a "membrane" is not particularly restricted as to thickness, and in the case of an oxygen separation membrane element indicates a membranous or layered part which functions as an "oxygen ion conductor" (preferably a mixed conductor). For example, a membranous oxygen separation layer with an average thickness of less than 5 mm (typically less than 1 mm, such as about 10 to 500 μm) formed on a specified porous substrate is a typical example of the form of such an oxygen separation membrane.

The form (outer diameter) of the oxygen separation membrane element is also not particularly limited. Examples include plate-shaped (including flat and curved), tubular (including open tubes open at both ends and closed tubes open at one end and closed at the other), and others formed as layers with an oxygen separation membrane less than 1 mm thick (such as a thin membrane less than 100 μm thick) as the oxygen separation membrane consisting of an oxide ceramic (oxygen ion conductor) with a perovskite structure. The outer diameter and size of the oxygen separation membrane element can be determined appropriately according to the sizes and shapes of the porous substrate on which the oxygen separation membrane is formed and the connecting member to be bonded to this substrate.

The oxygen separation membrane element disclosed here is characterized by a bond part (seal) constructed of the aforementioned leucite-containing glass, and the shapes and compositions of the other constituent parts, such as the porous substrate and oxygen separation membrane with a perovskite structure, can be determined at will according to various criteria.

Various types of ceramic porous bodies used conventionally for various membrane elements can be used for the porous substrate supporting the oxygen separation membrane. A material that is stably heat-resistant at the operating temperature range of the membrane element (normally 500° C. or more or typically 800° C. or more, such as 800 to 900° C. or preferably 800 to 1000° C.) is used by preference. For example, a ceramic porous body having a composition similar to that of the oxygen separation membrane with a perovskite structure can be used, or else a ceramic porous body consisting mainly of magnesia, zirconia, silicon nitride, silicon carbide or the like. Alternatively, a metal porous body consisting mainly of metal material can be used. A suitable average pore diameter for the porous body based on the mercury intrusion technique is about 0.1 to 20 μm, although this is not a limitation, and porosity based on the mercury intrusion technique can be about 5 to 60%.

The oxide ceramic making up the oxygen separation membrane can be any with a perovskite structure that is an oxygen ion conductor, and the constituent elements thereof are not particularly limited. A mixed conductor having both oxygen ion conductivity and electron conductivity is preferred because it can continuously transmit oxygen ions (oxide ions) from one side (oxygen supply side) to the other (oxygen transmission side) of the oxygen separation membrane without the use of an external electrode or external circuit.

Typical examples of such oxide ceramics include composite oxides of the composition represented by the general formula $Ln_{1-x}Ae_xMO_3$. In this formula, Ln is at least one selected from the lanthanoids (typically La), Ae is at least one selected from the group consisting of Sr, Ca and Ba, M is at least one selected from the group consisting of Mg, Mn, Ga, Ti, Co, Ni, Al, Fe, Cu, In, Sn, Zr, V, Cr, Zn, Ge, Sc and Y, and $0 \leq x \leq 1$. An example of a preferred mixed conductor is the composite oxide represented by the formula $(La_{1-x}Sr_x)(Ti_{1-y}Fe_y)O_3$ (wherein $0<x<1$, $0<y<1$) (hereunder sometimes called "LSTF oxide"). Specific examples include $La_{0.6}Sr_{0.4}Ti_{0.1}Fe_{0.9}O_3$, $La_{0.6}Sr_{0.4}Ti_{0.3}Fe_{0.7}O_3$ and the like.

The number of oxygen atoms is represented as 3 in the above general formula, but in fact the number of oxygen atoms may be 3 or less (typically less than 3). However, because the number of oxygen atoms fluctuates according to the types of atoms substituted for part of the perovskite structure (such as some of the Ae and M in the formula), it is difficult to represent exactly. Therefore, in these specifications the number of oxygen atoms in a general formula representing a perovskite material is represented as 3 for purposes of convenience, but this is not intended to limit the technical scope of the invention being presented. Consequently, the number of oxygen atoms could for example be represented as $3-\delta$. $\delta$ here is typically a positive number no greater than 1 ($0<\delta<1$).

There are no particular limits on the form (outer diameter) of the ceramic connecting member that is to be bonded to the oxygen separation membrane of the oxygen separation membrane element. The connecting member can have a plate, tube or other shape according to the shape of the porous substrate and the oxygen separation membrane formed on this substrate.

The ceramic connecting member can also be formed from various materials (such as a connecting member of the same material as the porous substrate), but preferably is of a material similar to that of the oxygen separation membrane (that is, a perovskite oxide). Having the oxygen separation membrane and connecting member be both of perovskite oxide (typically oxides of the same composition) makes it possible for these members and the bond material (glass seal material) described below to have similar thermal expansion coefficients. As a result, it is possible to more reliably prevent cracks from occurring in the bond due to differences in thermal expansion caused by rising and falling temperatures (heating and cooling) during manufacture and use.

The ceramic porous substrate and ceramic connecting member can be manufactured as follows for example.

Namely, a ceramic of the desired shape (porous substrate, connecting member) can be obtained by molding a powder of compounds including the atoms making up the ceramic to be manufactured (raw powder), and baking it in an oxidizing atmosphere (such as air) or an inactive gas atmosphere. A powder containing one or more oxides comprising the metal atoms making up the ceramic, or compounds capable of becoming such oxides (such as carbonates, nitrates, sulfates, phosphates, acetates, oxalates, halides, hydroxides, oxyhalides and the like), can be used as the raw powder. The raw powder may also contain a compound (such as a composite metal oxide or composite metal carbonate) that comprises two or more of the metal atoms making up the ceramic.

The appropriate baking temperature differs according to the composition of the ceramic and the like, but is typically 1000 to 1800° C. (preferably 1200 to 1600° C.). The baking step may include one or more pre-baking steps as well as a subsequent main baking step. In this case, the main baking step is performed at the baking temperature described above, while the pre-baking step is preferably performed at a baking temperature lower than that of the pre-baking step (such as 800 to 1500° C.).

For example, a pre-baking powder (raw powder for main baking) can be obtained by pre-baking the raw powder and then pulverizing this pre-baked powder with a wet ball mill or the like. Water, an organic binder or other molding aid and a dispersing agent can also be added to and mixed with the raw powder (or pre-baked powder) to prepare a slurry, which can then be granulated to the desired grain size (such as an average diameter of 10 to 100 μm) with a spray dryer or other granulator.

A conventional molding method such as uniaxial compression molding, isostatic pressing, extrusion molding or the like can be used to mold the raw powder or the pre-baked powder (raw powder for main molding) obtained by pulverizing the pre-baked product. Conventional binders, dispersers and the like can also be used for such molding.

The method of forming the oxygen separation membrane with a perovskite structure on the surface of the porous substrate is also not particularly limited, and various conventional methods can be adopted. For example, a powder (such as the LSTF oxide powder mentioned above) consisting of composite oxides with the composition needed to form a perovskite oxide can be mixed with suitable binders, dispersers, plasticizers, solvents and the like to prepare a slurry, and this slurry can then be applied to the porous substrate surface by a method such as ordinary dip coating. The coating thus obtained on the porous substrate can then be dried at a suitable temperature (typically 60 to 100° C.), and then baked at a temperature range such as the aforementioned to form, on the surface of the porous substrate (support), an oxygen separation membrane consisting of an oxide ceramic (such as LSTF oxide) with a perovskite structure.

Because the ceramic molding techniques themselves may be similar to conventional techniques in this case and do not characterize the invention, they will not be explained in detail here.

Next, desirable examples of the bond material (glass seal material) used to seal an oxygen separation membrane element of this configuration (or to bond other ceramic members) are explained in detail. The bond material (seal material) disclosed here is a material consisting mainly of a glass composition obtained by precipitating crystals of leucite ($KAlSi_2O_6$ or $4SiO_2.Al_2O_3.K_2O$) in a glass matrix. Consequently, an oxide glass containing $SiO_2$, $Al_2O_3$ and $K_2O$ as essential components is preferred. In addition to these essential components, it may also contain various other components (typically various oxide components) according to the object.

The precipitated amount of leucite crystals can be adjusted appropriately by adjusting the content ratios (compositional ratios) of these essential components in the glass composition.

When the oxygen separation membrane element is to be used at relatively high temperatures, such as 800 to 900° C. or preferably 800 to 1000° C. (for example, 900 to 1000° C.), a glass with a composition that resists melting at high temperatures is preferred. In this case, the desired high melting point (high softening point) can be achieved by adding or increasing the amounts of components that raise the melting point (softening point) of the glass.

Although this is not a limitation, it is desirable that the mass ratios as a percentage of all glass components (including the leucite crystal part) be 40 to 75 mass % $SiO_2$, 5 to 20 mass % $Al_2O_3$, 5 to 20 mass % $Na_2O$, 5 to 20 mass % $K_2O$, 0 to 3 mass % MgO, 0 to 3 mass % CaO and 0 to 3 mass % SrO in a bond material (glass composition) used for forming (that is, sealing) the bond part of an oxygen separation membrane element that is to be used at relatively high temperatures.

$SiO_2$ is a component of the leucite crystals, and is a principal component of the framework of the glass layer (glass matrix) of the bond part (seal part). If the $SiO_2$ content is too high, the melting point (softening point) will also be too high. If the $SiO_2$ content is too low, too few leucite crystals will be precipitated, and water-resistance and chemical resistance will also be adversely affected. For this application, it is desirable that the $SiO_2$ content be 40 to 75 mass % of the glass composition as a whole, or more preferably about 50 to 70%.

$Al_2O_3$ is a component of the leucite crystals, regulates the fluidity of the glass and contributes to adhesion stability. If the $Al_2O_3$ content is too low, adhesion stability will be poor and the glass layer (glass matrix) may not be formed with a uniform thickness, and also fewer leucite crystals will be precipitated. If the $Al_2O_3$ content is too high, the chemical resistance of the bond (seal) may be adversely affected. For this application, it is desirable that the $Al_2O_3$ content be 5 to 25 mass % of the glass composition as a whole, or more preferably about 10 to 20%.

$K_2O$ is a component of the leucite crystals, and increases the thermal expansion rate (thermal expansion coefficient) in conjunction with other alkali metal oxides (typically $Na_2O$). If the $K_2O$ content is too low too few leucite crystals will be precipitated. If the $K_2O$ and $Na_2O$ contents are too low they will not have the effect of increasing the thermal expansion rate (thermal expansion coefficient). If the $K_2O$ and $Na_2O$ contents are too high, however, the thermal expansion rate (thermal expansion coefficient) will be excessively high. For this application, it is desirable that the $K_2O$ content be 5 to 20 mass % of the glass composition as a whole, or more preferably about 10 to 15%. For this application, it is also desirable that the content of the other alkali metal oxide (typically $Na_2O$) be 5 to 20 mass % of the glass composition as a whole, or more preferably about 10 to 15%.

The alkali earth metal oxides MgO, CaO and SrO are optional additives capable of regulating the thermal expansion coefficient. CaO can also serve to increase the hardness of the glass layer (glass flux) and improve wear resistance, while MgO can regulate viscosity during glass melting. Adding these components can also improve chemical resistance because the glass matrix is composed in a multicomponent system. For this application, the content of each of these oxides is preferably zero (not added) or less than 3 mass % of the glass composition as a whole. For this application, the combined amount of MgO, CaO and SrO is preferably 3 mass % or less of the glass composition as a whole.

Components other than the aforementioned oxide components that are not essential for implementing the present invention (such as $B_2O_3$, ZnO, $Li_2O$, $Bi_2O_3$, SnO, $SnO_2$, CuO, $Cu_2O$, $TiO_2$, $ZrO_2$ and $La_2O_3$) can also be added for various purposes.

For this application, these various components are compounded to prepare a glass composition (bond material) so that the thermal expansion coefficient of the glass making up the bond (seal part) is 10 to $14 \times 10^{-6} K^{-1}$. For this application, it is especially desirable to prepare the material so that the thermal expansion coefficient is roughly 11 to $13 \times 10^{-6} K^{-1}$.

There are no particular restrictions on the method of manufacturing the glass composition that is the main constituent of the leucite-containing glass (that is, the bond material (glass seal material) of the present invention), and methods similar to those used for manufacturing conventional leucite-containing glass can be used. Typically, compounds for obtaining the various oxide components making up the composition (such as industrial products, reagents or various mineral materials including oxides, carbonates, nitrates, composite oxides and the like containing each of the components) and other additives as necessary are placed in a dry or wet ball mill or other mixer in the desired ratios, and mixed for a few hours or tens of hours.

The resulting mixture (powder) is dried and placed in a flame-resistant crucible, and heated and melted under suitable temperature conditions (typically 1000° C. to 1500° C.).

The resulting glass is pulverized and subjected to crystallization heat treatment. For example, leucite crystals can be precipitated in the glass matrix by heating the glass powder from room temperature to about 100° C. at a rate of about 1 to 5° C. a minute, and maintaining it for about 30 to 60 minutes at a temperature range of 800 to 1000° C.

The resulting leucite-containing glass can be molded into the desired form by various methods. For example, it can be pulverized in a ball mill and sieved as necessary to obtain a powdered glass composition of the desired average grain size (such as 0.1 μm to 10 μm).

Like conventional glass compositions used for various purposes, a powdered glass material (bond material) obtained by such a crystallization heat process can typically be made into a paste and applied to the connected parts of the ceramic connecting member and oxygen separation membrane. For example, the resulting glass powder can be mixed with suitable binders and solvents to prepare a paste composition (bond material). The binders, solvents and other components (such as dispersers) used in the paste are not particularly limited, and those conventionally used in paste manufacture can be selected and used as necessary.

Suitable examples of binders include cellulose and its derivatives. Specific examples include hydroxymethyl cellulose, hydroxyethyl cellulose, hydroxypropyl cellulose, hydroxypropyl methyl cellulose, carboxymethyl cellulose, carboxyethyl cellulose, carboxyethyl methyl cellulose, cellulose, ethyl cellulose, methyl cellulose, ethyl hydroxyethyl cellulose and salts of these. The binder is preferably included in the amount of 5 to 20 mass % of the paste as a whole.

Examples of solvents that can be included in the paste include ether solvents, ester solvents, ketone solvents and other organic solvents. Desirable examples include ethylene glycol and diethylene glycol derivatives, toluene, xylene, terpineol and other high-boiling-point organic solvents and combinations of two or more of these. The content of the solvent in the paste is not particularly limited but is preferably about 1 to 40 mass % of the paste as a whole.

The bond material (glass seal material) disclosed here can be used in the same way as a similar conventional seal material. For this application, specifically, the parts to be bonded on the oxygen separation membrane (and porous substrate) and connecting member are brought into contact and connected to one another, and the bond material (glass seal material) prepared as a paste is applied to these connected parts. The applied bond material (glass seal material) is dried at a suitable temperature (typically 60 to 100° C.), and then baked at a suitable temperature range, such as preferably a temperature that is higher than the operating temperature range of the oxygen separation membrane element (800 to 900° C. for example or a higher temperature range, typically 800° C. to 1000° C.) and at which there is no outflow of glass (for example, at least 800° C. but less than 1200° C. for operating temperature ranges up to 800° C., or at least 900° C. but less than 1200° C. for operating temperature ranges up to 900° C., or preferably at least 1000° C., such as at least 1000° C. but less than 1200° C., or typically 1000° C. to 1100° C.) to thereby form a bond part on the connected parts of the oxygen separation membrane (and porous substrate) and connecting member while also forming a seal part without gas leaks.

Some examples of the oxygen separation membrane element disclosed above are explained here, but the intent is not to limit the present invention to the following examples.

Preparation of Oxygen Separation Membrane Consisting of LSTF Oxide

A common binder (methyl cellulose was used here) and water were added to LSTF ($La_{0.6}Sr_{0.4}Ti_{0.3}Fe_{0.7}O_3$) powder (average grain size about 50 μm), and kneaded. Next, the kneaded product was extrusion molded to obtain a cylindrical molded body with an outer diameter of about 20 mm, an inner diameter of about 12 mm and a total length of about 1000 mm. This molded body was then baked at 1400 to 1500° C. (the maximum baking temperature here was about 1400° C.) in atmosphere. After baking, the baked product was surface polished to prepare LSTF porous substrate 14 (FIG. 1) with the desired outside dimensions (outer diameter 20 mm, inner diameter 12 mm, total length 1000 mm).

Suitable amounts of a common binder and water were also added to the $La_{0.6}Sr_{0.4}Ti_{0.3}Fe_{0.7}O_3$ powder with an average grain size of about 1 μm that is the LSTF oxide for this example, and mixed to prepare a slurry for membrane formation.

Next, The cylindrical LSTF molded body obtained above was dip coated by immersing it in this slurry. The molded body thus coated with the slurry was dried at 80° C., heated in atmosphere to a temperature range of 1000 to 1600° C. (the maximum baking temperature here was about 1400° C.), and maintained at the maximum temperature for 3 hours to bake the molded body. In this way, oxygen separation membrane 15 (FIG. 1) consisting of the LSTF oxide of this example, which is a perovskite oxide, was formed on the surface of cylindrical porous substrate 14.

Preparation of Connecting Members

A common binder (polyvinyl alcohol was used here) and water were added to the aforementioned $La_{0.6}Sr_{0.4}Ti_{0.3}Fe_{0.7}O_3$ powder with an average grain size of 1 μm, and kneaded. This was then granulated with a commercial spray drier to obtain a raw powder with an average grain size of about 60 μm. The resulting raw powder was then press molded under pressure conditions of 100 MPa to obtain a disc-shaped molded body about 35 mm in outer diameter and 20 mm thick. This molded body was then subjected to 150 MPa of pressure by CIP molding.

The resulting molded body was first heated in atmosphere to a temperature range of about 200 to 500° C. (here about 500° C.), and maintained for 10 hours. This served to break down and remove organic matter. Next, it was heated to a temperature range of 1300 to 1600° C. (the maximum baking temperature here was about 1400° C.), and then baked by maintaining it at the maximum temperature for 3 hours to thereby obtained a baked body consisting of perovskite oxide of the same composition as oxygen separation membrane 15 above.

Next, this disc-shaped baked body was mechanically polished to prepare the disc-shaped connecting member (hereunder called "cap member 12") 20 mm in outer diameter by 5 mm thick indicated by the number 12 in FIG. 1 and the connecting member (hereunder called "ring member 16") indicated by number 16 in FIG. 1, which is a disc-shaped connecting member 27 mm in outer diameter by 20 mm in inner diameter by 15 mm thick having through hole 17 formed on the inside for inserting porous substrate 14.

Preparation of Paste Bond Material (Glass Seal Material)

$SiO_2$ powder, $Al_2O_3$ powder, $Na_2O$ powder, $K_2O$ powder, MgO powder and CaO powder with average grain sizes of about 1 to 10 μm were mixed in the mass ratios shown in Table 1 to prepare 6 kinds of raw powder (Samples 1 through 6).

Next, the raw powders were melted at a temperature range of 1000 to 1600° C. (1550° C. here) to prepare glass. This glass was then pulverized and subjected to crystallization heat treatment at a temperature of 800 to 1000° C. (850° C. here) for 30 to 60 minutes. This served to precipitate leucite crystals in a dispersed state in the glass matrix.

TABLE 1

| Glass composition (mass %) | Sample No. | | | | | |
| --- | --- | --- | --- | --- | --- | --- |
| | 1 | 2 | 3 | 4 | 5 | 6 |
| $SiO_2$ | 69.7 | 67.0 | 63.9 | 60.2 | 71.9 | 55.5 |
| $Al_2O_3$ | 12.8 | 13.9 | 15.3 | 16.9 | 11.9 | 18.8 |
| $Na_2O$ | 7.8 | 8.5 | 9.3 | 10.2 | 7.2 | 11.4 |
| $K_2O$ | 8.3 | 9.1 | 9.9 | 11.0 | 7.7 | 12.2 |
| MgO | 0.6 | 0.6 | 0.7 | 0.7 | 0.5 | 0.8 |
| CaO | 0.8 | 0.9 | 0.9 | 1.0 | 0.7 | 1.2 |
| Thermal expansion coefficient of seal ($\times 10^{-6}$/K) | 10.7 | 11.6 | 12.4 | 13.4 | 9.6 | 14.5 |
| Gas leak test (leaks present or not) | No | No | No | No | Yes | Yes |

*) Thermal expansion coefficient of LSTF oxide: $11.5 \times 10^{-6}$/K

The leucite-containing glass thus obtained was pulverized and sorted to obtain six kinds (Samples 1 through 6) of leucite-containing glass powder (glass seal material) with an average grain size of about 2 μm, corresponding to the mass ratios shown in Table 1.

Next, 3 parts by mass of a common binder (ethyl cellulose in this case) and 47 parts by mass of a solvent (terpineol in this case) were added to 40 parts by mass of the glass powder to prepare 6 kinds of paste bond material (glass seal material) corresponding to Samples 1 through 6 in Table 1.

Bonding

Figure 2:
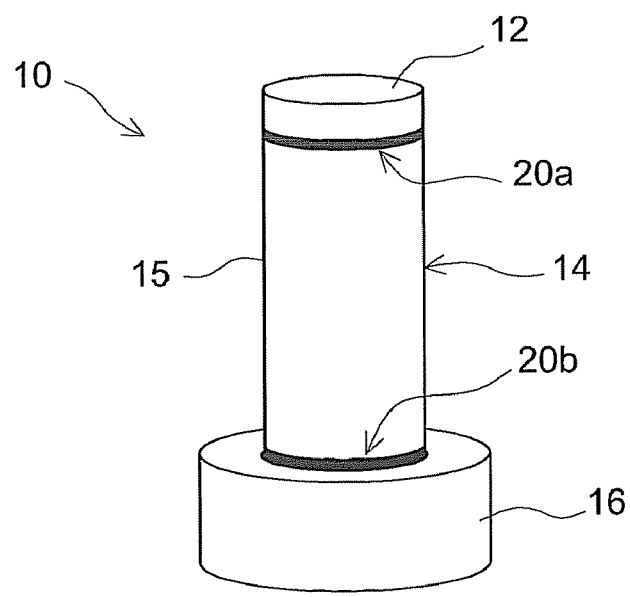
FIG. 2 is a perspective view showing the configuration of an oxygen separation membrane element of one example.

Bonding was performed using these 6 different pastes as seal materials. Specifically, as shown in FIGS. 1 and 2, one end face 14b of cylindrical porous substrate 14 was inserted into insertion hole 17 of ring member 16, and cap member 12 was arranged on the other end face 14a. The aforementioned paste was then applied to contact site (connection) 20a between cap member 12 and oxygen separation membrane 15 on the surface of porous substrate 14, and to contact site (connection) 20b between ring member 16 and oxygen separation membrane 15.

This was dried at 80° C. and then baked for 1 hour in atmosphere at a temperature range of 1000 to 1100° C. (1050° C. in this case). As a result, baking was completed with no outflow of the glass seal material using any of the sample pastes, and seals 20a and 20b were formed bonding the two members. In this way, 6 kinds (Samples 1 through 6 of membrane elements 10 were constructed having both ends of porous substrate 14 and oxygen separation membrane 15 bonded to connecting members (cap member 12 and ring member 16). Table 1 shows the thermal expansion coefficients (average values for thermal expansion (linear expansion) between room temperature (25° C.) and 450° C.) of the seals (glass) obtained using each sample paste as measured based on JIS R 1618. The thermal expansion coefficient (linear expansion rate) of the LSTF oxide ceramic making up oxygen separation membrane 15 and connecting members 12 and 16 under the same conditions was $11.5 \times 10^{-6} K^{-1}$.

Although precise data are not given, when similar bonding was performed using commercial borosilicate glass having an average particle diameter of 1 μm (Pyrex® glass) made into a paste under the same conditions, conspicuous outflow and cracks occurred at the bonding site during baking. Using commercial silver paste (that is, a paste material for forming conductors), bonding could not be accomplished due to outflow and scattering.

Figure 3:
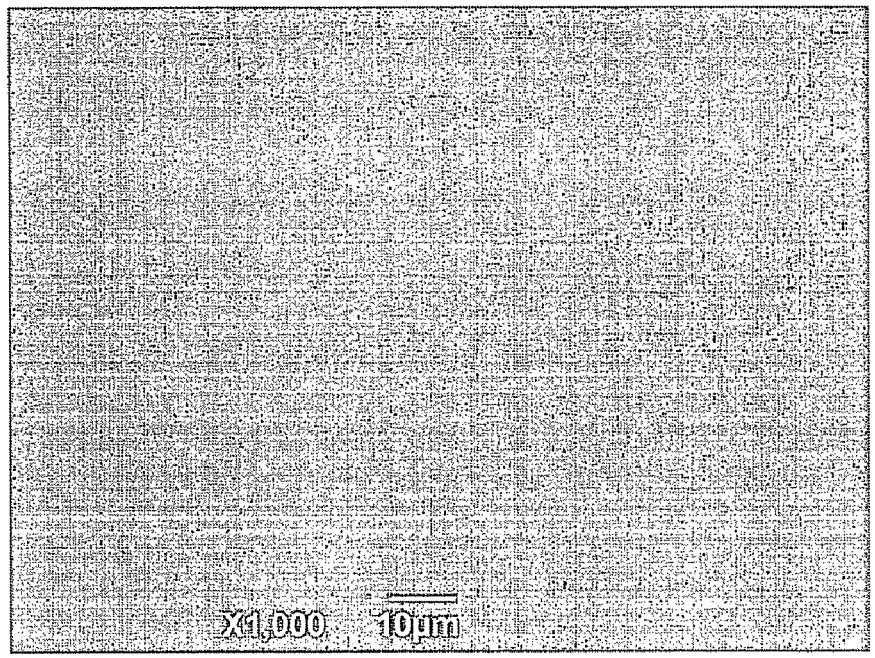
FIG. 3 is a scanning electron microscope (SEM) image showing the surface of a seal with no apparent cracks in an oxygen separation membrane element of one example.
Figure 4:
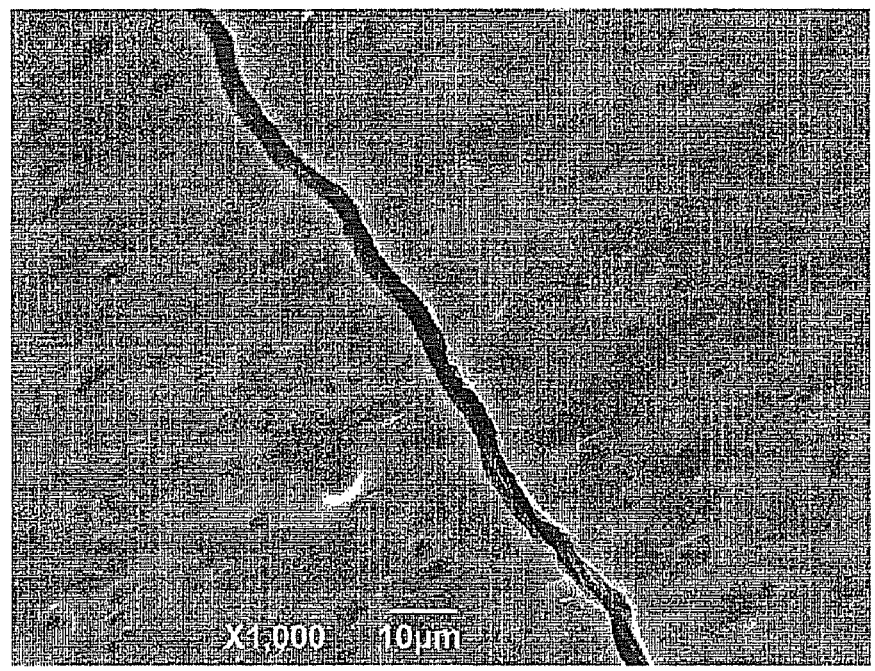
FIG. 4 is a scanning electron microscope (SEM) image showing cracks occurring in the surface of a seal of an oxygen separation membrane element of a comparative example.

The surfaces of the bonds (seals 20b) of the 6 kinds of membrane elements 10 obtained above were observed under an electron microscope (SEM). As a result, a dense seal surface without cracks (see FIG. 3) was observed in the case of Samples 1 through 4, in which the thermal expansion coefficient of the seal (leucite-containing glass) was 10 to $14 \times 10^{-6} K^{-1}$. In the case of Sample 5, in which the thermal expansion coefficient was less than $10 \times 10^{-6} K^{-1}$, and Sample 6, in which the thermal expansion coefficient was more than $14 \times 10^{-6} K^{-1}$, cracks were seen on the seal surface (Sample 6 is shown in FIG. 4).

Gas Leak Test

Next, a leak test was performed to confirm the presence or absence of gas leaks from the bonds (seals) of the 6 kinds of membrane elements (Samples 1 through 6) constructed above. Specifically, air was supplied under conditions of 0.2 MPa pressure from the bottom opening of insertion hole 17 of ring member 16 to hollow part 13 of membrane element 10, membrane element 10 was immersed in water under these conditions, and the presence or absence of bubbles in the water was observed. The results are shown in the corresponding columns of Table 1.

As shown in Table 1, no gas (air) leaks were observed in the case of Samples 1 through 4, in which the thermal expansion coefficient of the seal (leucite-containing glass) was 10 to $14 \times 10^{-6} K^{-1}$. On the other hand, bubbles, or in other words gas (air) leaks from the seal surface were observed in the case of Sample 5, in which the thermal expansion coefficient was less than $10 \times 10^{-6} K^{-1}$, and Sample 6, in which the thermal expansion coefficient was more than $14 \times 10^{-6} K^{-1}$.

Next, a fuel cell (SOFC) provided with a zirconia solid electrolyte and separator, the ceramic members making up this SOFC, and the bond material (seal material) for bonding these ceramic members together are explained in detail as another preferred example of a ceramic product provided by the present invention.

The fuel cell (SOFC) disclosed here is characterized in that the bond part (seal) between the zirconia solid electrolyte and separator (lanthanum-chromite oxide) is composed of leucite-containing glass, and the forms and compositions of the other constituent parts, such as the fuel electrode (anode) and air electrode (cathode) can be determined at will according to various criteria. The present invention can provide a single SOFC cell (for example, a single-cell constituent unit comprising a separator already bonded to a solid electrolyte), or an SOFC stack composed of multiple single SOFC cells (typically single cells without separators) interspersed with separators bonded to the solid electrolytes of these single cells.

A zirconia solid electrolyte is used as the solid electrolyte for constructing the SOFC disclosed here. Typically, zirconia (YSZ) stabilized with yttria ($Y_2O_3$) is used. Other desirable examples of zirconia solid electrolytes include zirconia (CSZ) stabilized with calcia (CaO) and zirconia (SSZ) stabilized with scandia ($Sc_2O_3$).

A lanthanum-chromite oxide, which is an electron conductor and physically blocks oxygen supply gas (such as air) and fuel gas, can be used as the separator (interconnector) for constructing the SOFC disclosed here.

In general, the oxide represented by the formula $La_{(1-x)}Ma_{(x)}Cr_{(1-y)}Mb_{(y)}O_3$ can be used. The Ma and Mb in the formula represent 1 or 2 or more alkali earth metals which may be the same or different, $0 \leqq x < 1$ and $0 \leqq y < 1$. Preferred examples include $LaCrO_3$ and oxides (lanthanum calcia chromite) in which Ma or Mb is calcium, such as $La_{0.8}Ca_{0.2}CrO_3$. The number of oxygen atoms is shown as 3 in the formula above, but in fact the number of oxygen atoms may be 3 or less (typically less than 3) in the actual compositional ratios.

The fuel electrode and air electrode of the SOFC disclosed here are not particularly limited and may be similar to those of conventional SOFCs. For example, a cermet of nickel (Ni) and YSZ or a cermet of ruthenium (Ru) and YSZ can be used by preference for the fuel electrode. A perovskite oxide such as lanthanum cobaltate ($LaCoO_3$) or lanthanum manganate ($LaMnO_3$) can be used by preference for the air electrode. Porous bodies made of these materials can be used for the fuel electrode and air electrode.

A single SOFC cell and stack may be manufactured in the same way as conventional SOFC cells and stacks, and no special processes are required for manufacturing the SOFC. The solid electrolyte, air electrode, fuel electrode and separator can be formed by various conventionally used methods.

For example, a YSZ molded body molded by extrusion molding or the like using a molding material consisting of the specified materials (such as YSZ powder with an average grain size of 0.1 to 10 μm, a binder such as methyl cellulose and a solvent such as water) can be baked in atmosphere under suitable temperature conditions (for example, 1300 to 1600° C.) to prepare a solid electrolyte of the desired shape (such as a plate or tube).

An air electrode-forming slurry consisting of the specified materials (such as the aforementioned perovskite oxide powder with an average grain size of about 0.1 μm to 10 μm, a binder such as methyl cellulose and a solvent such as water) can then be applied to one surface of the solid electrolyte, and baked in atmosphere under suitable temperature conditions (for example, 1300 to 1500° C.) to form a porous, film-shaped air electrode.

Next, the fuel electrode can be formed on the other surface (the surface without the air electrode) of the solid electrolyte by a suitable method such as atmospheric-pressure plasma spraying or low-pressure plasma spraying. For example, a porous, film-shaped fuel electrode consisting of the aforementioned cermet material can be formed by blowing a raw powder melted with plasma against the solid electrolyte surface.

Furthermore, a separator of the specified shape can be prepared by the same method as the solid electrolyte. For example, a molded body molded by extrusion molding or the like using a molding material consisting of the specified materials (such as lanthanum-chromite oxide powder with an average grain size of 0.1 to 10 μm, a binder such as methyl cellulose and a solvent such as water) can be baked in atmosphere under suitable temperature conditions (for example, 1300 to 1600° C.) to prepare a separator of the desired shape (such as a plate or tube).

Figure 5:
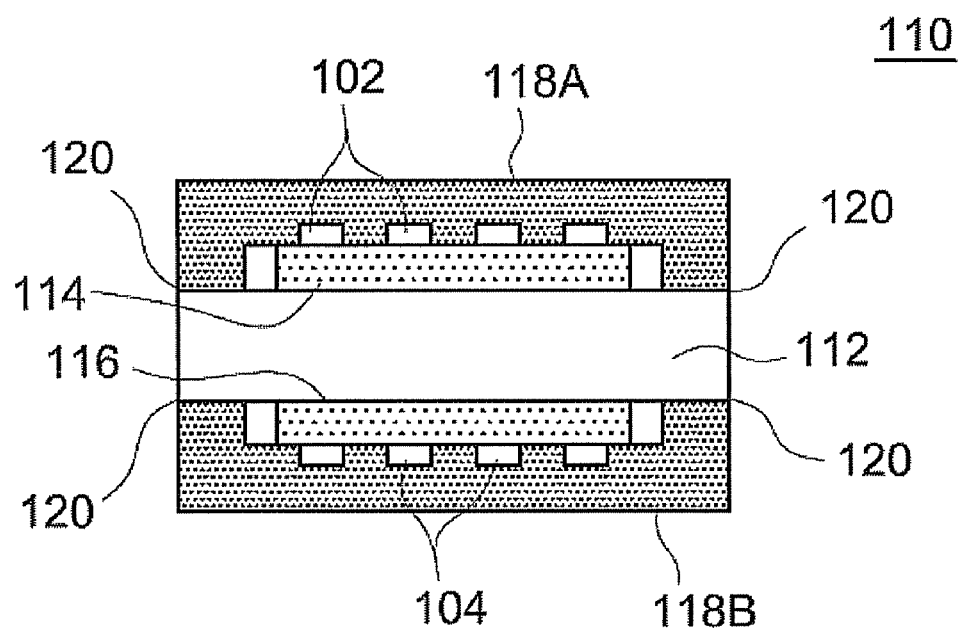
FIG. 5 is a cross sectional view showing a typical example of a flat SOFC (single cell)

The prepared separator can then be bonded to the solid electrolyte using the bonding material to manufacture a single SOFC cell and stack of the present invention. For example, taking the typical example shown in FIG. 5, fuel cell (SOFC) 110 can be provided having air electrode 114 formed on one face of plate-shaped solid electrolyte 112 and fuel electrode 116 formed on the other face, with separators 118A and 118B bonded via bond material 120 to solid electrolyte 112. Oxygen supply gas (typically air) conduits 102 are formed between air electrode 114 and separator 118A on the air electrode side, while fuel gas (hydrogen supply gas) conduits 104 are formed between fuel electrode 116 and separator 118B on the fuel electrode side.

Next, desirable examples of bond materials for bonding a solid electrolyte and separator of this configuration are explained in detail. The bond material disclosed here is a bond material consisting mainly of a glass composition that allows leucite ($KAlSi_2O_6$ or $4SiO_2.Al_2O_3.K_2O$) crystals to be precipitated within the glass matrix. Consequently, an oxide glass containing $SiO_2$, $Al_2O_3$ and $K_2O$ as essential components is preferred. In addition to these essential components, it can contain various other components (typically, various oxide components) according to the object.

The amount of precipitated leucite crystals can be adjusted appropriately by adjusting the contents (compositional ratios) of the aforementioned essential components in the glass composition.

When an SOFC is to be used at relatively high temperatures, such as 800 to 1200° C. or preferably 800 to 1000° C. (for example 900 to 1000° C.), a glass of a composition that resists melting at high temperatures is preferred. In this case, the desired high melting point (high softening point) can be achieved by adding or increasing those components that raise the melting point (softening point) of the glass.

The mass ratios of oxides as a percentage of all glass components (including the leucite crystal part) are not particularly limited, but are preferably 60 to 75 mass % $SiO_2$, 10 to 20 mass % $Al_2O_3$, 3 to 10 mass % $Na_2O$, 5 to 15 mass % $K_2O$, 0 to 3 mass % MgO, 0 to 3 mass % CaO and 0 to 3 mass % (preferably 0.1 to 3 mass %) $B_2O_3$.

$SiO_2$ is a component of the leucite crystals, and is a principal component of the framework of the glass layer (glass matrix) of the bond part (seal part). If the $SiO_2$ content is too high, the melting point (softening point) will also be too high. If the $SiO_2$ content is too low, too few leucite crystals will be precipitated, and water-resistance and chemical resistance will also be adversely affected. For this application, it is desirable that the $SiO_2$ content be 60 to 75 mass % of the glass composition as a whole, or more preferably about 65 to 75%.

$Al_2O_3$ is a component of the leucite crystals, regulates the fluidity of the glass and contributes to adhesion stability. If the $Al_2O_3$ content is too low, adhesion stability will be poor so that the glass layer (glass matrix) may not be formed with a uniform thickness, and also fewer leucite crystals will be precipitated. If the $Al_2O_3$ content is too high, the chemical resistance of the bond may be adversely affected. For this application, it is desirable that the $Al_2O_3$ content be 10 to 20 mass % of the glass composition as a whole.

$K_2O$ is a component of the leucite crystals, and increases the thermal expansion rate (thermal expansion coefficient) in conjunction with other alkali metal oxides (typically $Na_2O$). If the $K_2O$ content is too low, too few leucite crystals will be precipitated. If the $K_2O$ and $Na_2O$ contents are too low they will not have the effect of increasing the thermal expansion rate (thermal expansion coefficient). If the $K_2O$ and $Na_2O$ contents are too high, however, the thermal expansion rate (thermal expansion coefficient) will be excessively high. For this application, it is desirable that the $K_2O$ content be 5 to 15 mass % of the glass composition as a whole, or more preferably about 7 to 10%. For this application, it is also desirable that the content of the other alkali metal oxide (typically $Na_2O$) be 3 to 10 mass % of the glass composition as a whole. For this application, it is also desirable that the combined content of $K_2O$ and $Na_2O$ be 10 to 20 mass % of the glass composition as a whole The alkali earth metal oxides MgO and CaO are optional additives capable of regulating the thermal expansion coefficient. CaO can also serve to increase the hardness of the glass layer (glass flux) and improve wear resistance, while MgO can regulate viscosity during glass melting. Adding these components can also improve chemical resistance because the glass matrix is composed in a multicomponent system. For this application, the content of each of these oxides is preferably zero (not added) or no more than 3 mass % of the glass composition as a whole. For this application, the combined amount of MgO and CaO is preferably 2 mass % or less of the glass composition as a whole.

$B_2O_3$ is also an optional additive (may be 0 mass %). $B_2O_3$ is thought to have a similar effect to $Al_2O_3$ in glass, and may contribute to forming a multicomponent glass matrix. It also helps to improve the melting properties during bond material preparation. However, too much of this component is not desirable because it detracts from acid resistance. For this application, the content of $B_2O_3$ is preferably 0.1 to 3 mass % of the glass composition as a whole.

Components other than the aforementioned oxide components that are not essential for implementing the present invention (such as ZnO, $Li_2O$, $Bi_2O_3$, SrO, SnO, $SnO_2$, CuO, $Cu_2O$, $TiO_2$, $ZrO_2$ and $La_2O_3$) can also be added for various purposes.

For this application, these various components are preferably compounded to prepare a glass composition (bond material) so that the thermal expansion coefficient of the glass making up the bond (seal part) is 9 to $10 \times 10^{-6} K^{-1}$. The preparation of the glass composition is similar to that of the bond material (glass seal material) used for the oxygen separation membrane element described above, and is not explained again here.

A glass material (bond material) in powdered form obtained by crystallization heat treatment as described above can be typically made into a paste in the same way as a conventional bond material and applied to the connected parts of the zirconia solid electrolyte and separator. For example, a suitable binder and solvent can be mixed with the resulting glass powder to prepare a paste composition (bond material). The binder used as paste, solvent and other components (such as dispersers) are not particularly limited, and those conventionally used in paste manufacture can be selected and used as necessary (see above for desirable examples).

The bond material disclosed here can be used in the same way as a similar conventional bond material. Specifically, for this application, the parts to be bonded on the solid electrolyte and separator are brought into contact and connected to one another, and the bond material prepared as a paste is applied to these connected parts. The applied bond material is dried at a suitable temperature (typically 60 to 100° C.), and then baked at a suitable temperature range, such as preferably a temperature that is higher than the operating temperature of the SOFC (for example 800 to 1000° C. or a higher temperature range, typically 800° C. to 1200° C.) for this application, and at which there is no outflow of glass (for example, typically 1000° C. to 1200° C. for an operating temperature range of up to about 1000° C., or typically 1200° C. to 1300° C. for an operating temperature range up to 1200° C.) to thereby form a bond (seal) without gas leaks on the connected parts of the solid electrolyte and separator.

Some examples of the SOFC disclosed here are explained below, but the intent is not to limit the present invention to what is shown in these examples. Because the primary object of the following examples was to evaluate the properties of the bond material provided by the present invention, samples consisting of members corresponding to solid electrolytes and separators were prepared, rather than actual SOFCs.

Preparation of YSZ Solid Electrolyte

A common binder (polyvinyl alcohol (PVA) in this case) and solvent (water) were added to 3 to 8 mol % Y-stabilized zirconia powder (average grain size about 1 μm), and kneaded. Next, the kneaded product was press molded to obtain a square, plate-shaped molded body about 30 mm long, 30 mm wide and 3 mm thick. This molded body was then baked in atmosphere at about 1400 to 1600° C. (the maximum baking temperature here was about 1400° C.). After baking, the baked product was surface polished to prepare thin-plate solid YSZ electrolyte 132 (FIG. 6) made of YSZ with the specified outer dimensions (30 mm×30 mm×1 mm thick).

Preparation of Member Corresponding to Separator

A common binder (polyvinyl alcohol (PVA) in this case) and solvent (water) were added to $La_{0.8}Ca_{0.2}CrO_3$ powder (average grain size about 1 μm), and kneaded. Next, the kneaded product was press molded to obtain a molded body about 30 mm long, 30 mm wide and 3 mm thick. This molded body was then baked in atmosphere at about 1400 to 1600° C. (the maximum baking temperature here was about 1400° C.). After baking, the baked product was surface polished to prepare thin-plate member 138 (FIG. 6) consisting of lanthanum-calcia-chromite with the specified outer dimensions (30 mm×30 mm×1 mm thick).

Preparation of Paste Bond Material $SiO_2$ powder, $Al_2O_3$ powder, $Na_2CO_3$ powder, $K_2CO_3$ powder, $MgCO_3$ powder, $CaCO_3$ powder and $B_2O_3$ powder with an average grain size of 1 to 10 μm were mixed in the mass ratios shown in Table 2 to prepare 6 kinds (Samples 11 through 16) of raw powder (the various hydrogencarbonates can be used in place of the carbonates shown here).

Next, the raw powders were melted at a temperature range of 1000 to 1500° C. (1450° C. here) to prepare glass. This glass was then pulverized and subjected to crystallization heat treatment at a temperature of 800 to 1000° C. (850° C. here) for 30 to 60 minutes. This served to precipitate leucite crystals in a dispersed state in the glass matrix.

TABLE 2

| Composition (mass %) | Sample No. | | | | | |
|---|---|---|---|---|---|---|
| | 11 | 12 | 13 | 14 | 15 | 16 |
| $SiO_2$ | 71.9 | 67.3 | 63.4 | 60.6 | 57.3 | 53.4 |
| $Al_2O_3$ | 11.8 | 16.5 | 11.5 | 12.4 | 13.4 | 14.6 |
| $Na_2O$ | 7.6 | 4.6 | 12.2 | 13.1 | 14.2 | 15.5 |
| $K_2O$ | 7.2 | 10.0 | 10.7 | 11.5 | 12.6 | 13.7 |
| MgO | 0.5 | 0.5 | 1.1 | 1.2 | 1.3 | 1.4 |
| CaO | 0.5 | 0.5 | 1.1 | 1.2 | 1.3 | 1.4 |
| $B_2O_3$ | 0.5 | 0.5 | 0 | 0 | 0 | 0 |
| Thermal expansion coefficient of seal (×10$^{-6}$/K) | 9.3 | 9.8 | 10.7 | 11.6 | 12.4 | 13.4 |
| Gas leak test (Yes/no) | No | No | Yes | Yes | Yes | Yes |

*) Thermal expansion coefficient of YSZ solid electrolyte: $10.2 \times 10^{-6}$/K
*) Thermal expansion coefficient of member corresponding to $La_{0.8}Ca_{0.2}CrO_3$ separator: $9.7 \times 10^{-6}$/K The leucite-containing glass thus obtained was pulverized and sorted to obtain six kinds (Samples 11 through 16) of leucite-containing glass powder (bond material) with an average grain size of about 2 μm, corresponding to the mass ratios shown in Table 2.

Next, 3 parts by mass of a common binder (ethyl cellulose in this case) and 47 parts by mass of a solvent (terpineol in this case) were added to 40 parts by mass of the glass powder to prepare 6 kinds of paste bond material corresponding to Samples 11 through 16 in Table 2.

Bonding

Figure 6:
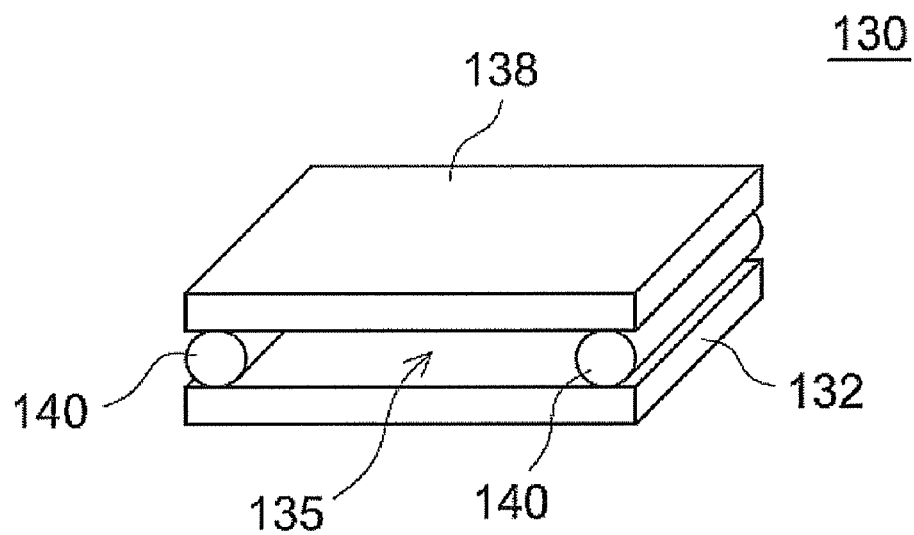
FIG. 6 is a perspective view showing the configuration of a bond (test sample) prepared in one example.

Bonding was performed using these 6 different pastes as bond materials. Specifically, as shown in FIG. 6, the aforementioned paste bond material 140 was applied to the two opposite edges of thin-plate solid electrolyte 132 and same-shaped member 138 corresponding to the thin-plate separator, and the two were joined together. This was then dried at 80° C. and baked for 1 hour in atmosphere at a temperature range of 1000 to 1100° C. (1050° C. here).

As a result, baking was completed with no outflow of the glass seal material using any of the sample pastes, and samples (bonded constructs) 130 were obtained with bonds 140 formed on the pair of opposite edges of the joined members 132 and 138 (FIG. 6).

FIG. 2 shows the thermal expansion coefficients (average values for thermal expansion (linear expansion) between room temperature (25° C.) and 450° C.) of the bonds obtained using each sample paste as measured based on JIS R 1618. The thermal expansion coefficient (linear expansion rate) of the YSZ solid electrolyte used here was $10.2\times10^{-6}K^{-1}$ under the same conditions. The thermal expansion coefficient of the member corresponding to a thin-plate separator, which was made of the aforementioned lanthanum-calcia-chromite, was $9.7\times10^{-6}K^{-1}$.

The surfaces of the bond parts 40 of the 6 kinds of samples 10 obtained here were observed under an electron microscope (SEM). As a result, a dense bond surface without cracks (not shown) was observed in the case of Samples 11 through 12, in which the thermal expansion coefficient was 9 to $10\times10^{-6}K^{-1}$. In the case of Samples 13 through 16, in which the thermal expansion coefficient was greater than $10\times10^{-6}K^{-1}$, cracks were observed on the bond surface.

Gas Leak Test

Next, a leak test was performed to confirm the presence or absence of gas leaks from the bonds 140 of the 6 kinds of samples 130 (bonded constructs) constructed above (Samples 11 through 16). Specifically, a gas pipe (not shown) was affixed with epoxy resin to the open part of the sample 130 (bonded construct) lacking bond 140. Air was then supplied from this gas pipe under conditions of 0.2 MPa pressure to hollow part 135 between members 132 and 138 of sample 130, sample 130 was immersed in water under these conditions, and the presence or absence of bubbling in the water was observed with the naked eye. The results are shown in the corresponding column of Table 2.

As shown in Table 2, no gas (air) leaks were observed in the case of Samples 11 through 12, in which the thermal expansion coefficient of bonds 140 was 9 to $10 \times 10^{-6} K^{-1}$. Bubbling from the surfaces bonds 140, or in other words gas (air) leakage, was observed in the case of Samples 13 through 16, in which the thermal expansion coefficient was greater than $10 \times 10^{-6} K^{-1}$.

As discussed above, with the present invention it is possible to bond (that is, form a bond between) a zirconia solid electrolyte and a separator made of lanthanum-chromite oxide in such a way as to ensure airtightness without gas leaks. As a result, a mechanically strong and highly durable SOFC (single cell or stack) can be provided.

Moreover, as discussed above, with the present invention it is possible to bond (that is, form a seal between) an oxygen separation membrane and a joint tube or other connecting member in such a way as to ensure airtightness without gas leaks. As a result, oxygen separation membrane elements formed by bonding oxygen separation membranes (and porous substrates) to various connecting members in various ways depending on the application can be provided, as well as oxygen separation modules constructed with such membrane elements as constituent elements.

An oxygen separation membrane element provided by the present invention is preferably suitable for use at a temperature range of 800 to 1000° C. for example, and can be used favorably in the GTL or fuel cell field.

What is claimed is:

1. A solid oxide fuel cell, comprising:
    a fuel electrode, an air electrode, a zirconia solid electrolyte and a separator bonded to this solid electrolyte, wherein the separator is formed of lanthanum-chromite oxide in which an alkali earth metal may or may be not substituted for part of the lanthanum or chromium, and
    a bond part between the solid electrolyte and the separator is formed from a crystalline-amorphous composite material characterized by having leucite crystals precipitated in a dispersed state in a glass matrix, and wherein the bond part is formed of the following oxide components in the following mass ratios as oxides:

| | |
|---|---|
| $SiO_2$ | 60 to 75 mass % |
| $Al_2O_3$ | 10 to 20 mass % |
| $Na_2O$ | 3 to 10 mass % |
| $K_2O$ | 5 to 15 mass % |
| MgO | 0 to 3 mass % |
| CaO | 0 to 3 mass % |
| $B_2O_3$ | 0 to 3 mass %; | and wherein the thermal expansion coefficient of the crystalline-amorphous composite material making up the bond part is 9 to $10 \times 10^{-6} K^{-1}$.

2. The solid oxide fuel cell according to claim 1, wherein the thermal expansion coefficient of the crystalline-amorphous composite material making up the bond part is 9.3 to $9.8 \times 10^{-6} K^{-1}$.

3. A bond material for use in bonding a solid electrolyte and a separator of a solid oxide fuel cell, the material comprising
    a powder of crystalline-amorphous composite material characterized by having leucite crystals precipitated in a dispersed state in a glass matrix,
    a solvent for dispersing the powder, and
    an organic compound that functions as a binder, wherein the crystalline-amorphous composite material is effectively composed of the following components in the following mass ratios as oxides:

| | |
|---|---|
| $SiO_2$ | 60 to 75 mass % |
| $Al_2O_3$ | 10 to 20 mass % |
| $Na_2O$ | 3 to 10 mass % |
| $K_2O$ | 5 to 15 mass % |
| MgO | 0 to 3 mass % |
| CaO | 0 to 3 mass % |
| $B_2O_3$ | 0 to 3 mass %, | and wherein the thermal expansion coefficient of the bond material is adjusted to 9 to $10 \times 10^{-6} K^{-1}$.

4. The bond material according to claim 3, wherein the thermal expansion coefficient of the bond material is adjusted to 9.3 to $9.8 \times 10^{-6} K^{-1}$.

* * * * *